United States Patent
Buckner et al.

(10) Patent No.: US 10,850,271 B2
(45) Date of Patent: Dec. 1, 2020

(54) ION EXCHANGE RESIN TRANSPORATION AND STORAGE

(71) Applicant: Evoqua Water Technologies LLC, Lowell, MA (US)

(72) Inventors: James Buckner, Beloit, WI (US); Gregory Bachman, Loves Park, IL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 57 days.

(21) Appl. No.: 15/679,217

(22) Filed: Aug. 17, 2017

(65) Prior Publication Data
US 2018/0050337 A1 Feb. 22, 2018

Related U.S. Application Data

(60) Provisional application No. 62/376,129, filed on Aug. 17, 2016.

(51) Int. Cl.
| | |
|---|---|
| B01J 49/60 | (2017.01) |
| B01J 49/53 | (2017.01) |
| B01J 47/04 | (2006.01) |
| B01J 39/18 | (2017.01) |
| G21F 9/22 | (2006.01) |
| G21F 5/002 | (2006.01) |
| G21F 5/12 | (2006.01) |
| C02F 1/20 | (2006.01) |
| G21F 9/12 | (2006.01) |
| C02F 1/42 | (2006.01) |
| B01J 47/016 | (2017.01) |
| B01J 47/14 | (2017.01) |

(52) U.S. Cl.
CPC ............. *B01J 49/60* (2017.01); *B01J 39/18* (2013.01); *B01J 47/016* (2017.01); *B01J 47/04* (2013.01); *B01J 47/14* (2013.01); *B01J 49/53* (2017.01); *C02F 1/20* (2013.01); *C02F 1/42* (2013.01); *G21F 5/002* (2013.01); *G21F 5/12* (2013.01); *G21F 9/12* (2013.01); *G21F 9/22* (2013.01); *B01J 2219/0286* (2013.01)

(58) Field of Classification Search
CPC .................................. B01J 49/60; C02F 1/20
See application file for complete search history.

(56) References Cited

U.S. PATENT DOCUMENTS

| | | | |
|---|---|---|---|
| 3,342,755 A | 9/1967 | Calmon et al. | |
| 3,941,837 A * | 3/1976 | Asano | B01J 23/72 564/127 |
| 4,847,432 A * | 7/1989 | Faler | B01J 31/10 568/727 |

OTHER PUBLICATIONS

Deyl et al. ("Journal of Chromotography Library—vol. 3. Liquid Column Chromotography: A survey of Modern Techniques and Applications" 1975, pp. 366-368) (Year: 1975).*

* cited by examiner

*Primary Examiner* — Peter F Godenschwager

(57) ABSTRACT

A method of stabilizing virgin ion exchange resin material is provided. The method includes rinsing virgin ion exchange resin material with deoxygenated water, introducing the rinsed virgin ion exchange resin material into a gas impermeable vessel and hermetically sealing the vessel. A vessel containing deoxygenated water and virgin ion exchange resin material is also provided. A method of facilitating water treatment in a site in need thereof by providing the gas impermeable vessel containing virgin ion exchange resin material and residual moisture from deoxygenated water is also provided.

19 Claims, 2 Drawing Sheets

ION EXCHANGE RESIN TRANSPORATION AND STORAGE

CROSS-REFERENCE TO RELATED APPLICATIONS

This application claims priority under 35 U.S.C. § 119(e) to U.S. Provisional Application Ser. No. 62/376,129 titled "Ion Exchange Resin Transportation to the Nuclear Industry in Dedicated Stainless Steel Vessels with Deoxygenation Membrane Option" filed on Aug. 17, 2016, which is herein incorporated by reference in its entirety.

FIELD OF TECHNOLOGY

Aspects and embodiments disclosed herein relate to stabilization of virgin ion exchange resin materials. More particularly, aspects and embodiments disclosed relate to methods of reducing a rate of oxidative degradation of virgin ion exchange resin materials. Aspects and embodiments disclosed relate to the handling, storage, and transportation of stabilized virgin ion exchange resin materials.

SUMMARY

In accordance with an aspect, there is provided a method of stabilizing virgin ion exchange resin material. The method of stabilizing ion exchange resin may comprise rinsing virgin ion exchange resin material with deoxygenated water to produce a rinsed virgin ion exchange resin material. The method of stabilizing ion exchange resin may comprise introducing the rinsed virgin ion exchange resin material into a gas impermeable vessel. The method of stabilizing virgin ion exchange resin material may comprise hermetically sealing the gas impermeable vessel.

In some embodiments, the method of stabilizing ion exchange resin may comprise rinsing virgin ion exchange resin material with deoxygenated water having a concentration of dissolved oxygen of less than about 10 ppb. The method of stabilizing ion exchange resin may comprise rinsing virgin ion exchange resin material with deoxygenated water having a concentration of dissolved oxygen of about 1 ppb. The method of stabilizing ion exchange resin may comprise rinsing virgin ion exchange resin material with deoxygenated water having a concentration of chlorine of less than about 10 ppb. The method of stabilizing ion exchange resin may comprise rinsing virgin ion exchange resin material with deoxygenated water having a concentration of chlorine of about 1 ppb.

In certain embodiments, methods disclosed herein may comprise rinsing virgin ion exchange resin material by introducing deoxygenated water into the gas impermeable vessel with the virgin ion exchange resin material, and removing interstitial deoxygenated water from the vessel. Rinsing with non-deoxygenated deionized water will also be an improvement over not rinsing immediately prior to usage of water at customer sites. This pre-rinse is designed to remove residual polymers and organic compound fragments entangled in resins. The deoxygenation of deionized water will minimize the process of oxygen in deionized rinse water breaking down the resin itself which will add to the organic (as measured by Total Organic Carbon—TOC) impurity level coming from ion exchange resins.

In some embodiments, methods disclosed herein may comprise maintaining a moisture content (which is related to polymer cross-linkage required for resin function, minimizing leaching of organic compounds and physical strength) in the rinsed virgin ion exchange resin material. For instance, in some embodiments the method comprises maintaining at least about 40% moisture content in the rinsed virgin ion exchange resin material. In some embodiments, the method comprises maintaining about 50% moisture content in the rinsed virgin ion exchange resin material. In some embodiments, the method comprises maintaining between about 40% and about 50% moisture content in the rinsed virgin ion exchange resin material.

In accordance with certain embodiments, methods disclosed herein may further comprise producing deoxygenated water. For instance, the deoxygenated water may be produced by deoxygenating non-deoxygenated water. The non-deoxygenated water may be deoxygenated by treating to remove dissolved oxygen. In some embodiments, the non-deoxygenated water may be deoxygenated by passing through a deoxygenation membrane. In some embodiments, the non-deoxygenated water may be deoxygenated by subjecting non-deoxygenated water to vacuum degasification.

In some embodiments, methods disclosed herein comprise rinsing the virgin ion exchange resin material with deoxygenated water having a concentration of dissolved oxygen effective to reduce a rate of oxidative degradation of the virgin ion exchange resin material. For instance, the rate of oxidative degradation may be reduced such that a first volume of water treated by the virgin ion exchange resin material comprises less than about 10 ppb total organic carbon. In some embodiments, the rate of oxidative degradation may be reduced such that the first volume of water treated by the virgin ion exchange resin material comprises less than about 10 ppb total organic carbon after maintaining the virgin ion exchange resin material in the vessel for a predetermined period of time.

In some embodiments, the rate of oxidative degradation may be reduced such that a first volume of water treated by the virgin ion exchange resin material comprises less than about 10 ppb sulfate. In some embodiments, the rate of oxidative degradation may be reduced such that a first volume of water treated by the virgin ion exchange resin material comprises less than about 10 ppb chloride. The rate of oxidative degradation may be reduced such that the first volume of water treated by the virgin ion exchange resin material comprises less than about 10 ppb sulfate and/or less than about 10 ppb chloride after maintaining the virgin ion exchange resin material in the vessel for a predetermined period of time. Organically bound chloride and sulfates are measured collectively as TOC. The individual organic sulfates and organic chlorides break down to form ionic chlorides and sulfates. They are measured analytically by UV light to breakdown the organic compound leaving ionic chlorides and sulfates which are analyzed using traditional methods.

In some embodiments, the rate of oxidative degradation may be reduced such that the first volume of water treated by the virgin ion exchange resin material comprises less than about 10 ppb total organic carbon, less than about 10 ppb sulfate, and/or less than about 10 ppb chloride after maintaining the virgin ion exchange resin material in the vessel for at least about six months.

In some embodiments, methods disclosed herein may further comprise unsealing the vessel and rinsing the virgin ion exchange resin material. The method may further comprise unsealing the vessel and rinsing the virgin ion exchange resin material after maintaining the virgin ion exchange resin material in the vessel for a predetermined period of time. For instance, the method may further comprise unsealing the vessel and rinsing the virgin ion exchange resin material after maintaining the virgin ion exchange resin material in the vessel for at least about six months. The method may further comprise unsealing the vessel and rinsing the virgin ion exchange resin material with deoxygenated water and/or deionized water (deoxygenated or non-deoxygenated) prior to use.

In accordance with another aspect, there is provided a method of facilitating water treatment at a site in need thereof. The method of facilitating water treatment at a site may comprise rinsing virgin ion exchange resin material with deoxygenated water to produce a rinsed virgin ion exchange resin material. The method of facilitating water treatment may comprise introducing the rinsed virgin ion exchange resin material into a gas impermeable vessel. The method may comprise hermetically sealing the vessel. In some embodiments, the method may comprise providing the gas impermeable vessel comprising the rinsed virgin ion exchange resin material and residual moisture to the site, for example, to the water treatment site. The residual moisture content may comprise, for example, between about 40% and about 50% moisture content.

In some embodiments, the method of facilitating water treatment at a site in need thereof may comprise rinsing virgin ion exchange resin material with deoxygenated water having a concentration of dissolved oxygen of less than about 10 ppb. The method of facilitating water treatment may comprise rinsing virgin ion exchange resin material with deoxygenated water having a concentration of dissolved oxygen of about 1 ppb. The method of facilitating water treatment may comprise rinsing virgin ion exchange resin material with deoxygenated water having a concentration of chlorine of less than about 10 ppb. The method of facilitating water treatment may comprise rinsing virgin ion exchange resin material with deoxygenated water having a concentration of chlorine of about 1 ppb.

In accordance with certain embodiments, methods disclosed herein may further comprise providing instructions. Methods may comprise providing instructions to maintain the virgin ion exchange resin material in the hermetically sealed vessel for a predetermined period of time. For example, methods may comprise providing instructions to maintain the virgin ion exchange resin material in the hermetically sealed vessel until it is ready to be used. In some embodiments, methods may further comprise providing instructions to unseal the vessel and rinse the virgin ion exchange resin material with deoxygenated water, for example, prior to use. Methods may comprise providing instructions to unseal the vessel and rinse the virgin ion exchange resin material prior to use in, for example, water treatment.

In accordance with another aspect, there is provided a vessel comprising virgin ion exchange resin material and deoxygenated water. In some embodiments, the vessel may be hermetically sealed. In some embodiments, the vessel may comprise deoxygenated water having less than about 10 ppb dissolved oxygen. The vessel may comprise deoxygenated water having less than about 10 ppb chlorine.

In some embodiments, the vessel may comprise a packaged desiccant media. For example, the vessel may comprise a packaged desiccant media within the vessel. In some embodiments, the vessel may be constructed from a gas impermeable material. For instance, the vessel may be constructed from at least one of stainless steel and epoxy-lined carbon steel.

In some embodiments, the virgin ion exchange resin material may be cation exchange resin. In some embodiments, the virgin ion exchange resin material may be anion exchange resin or mixed cation exchange resin and anion exchange resin.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
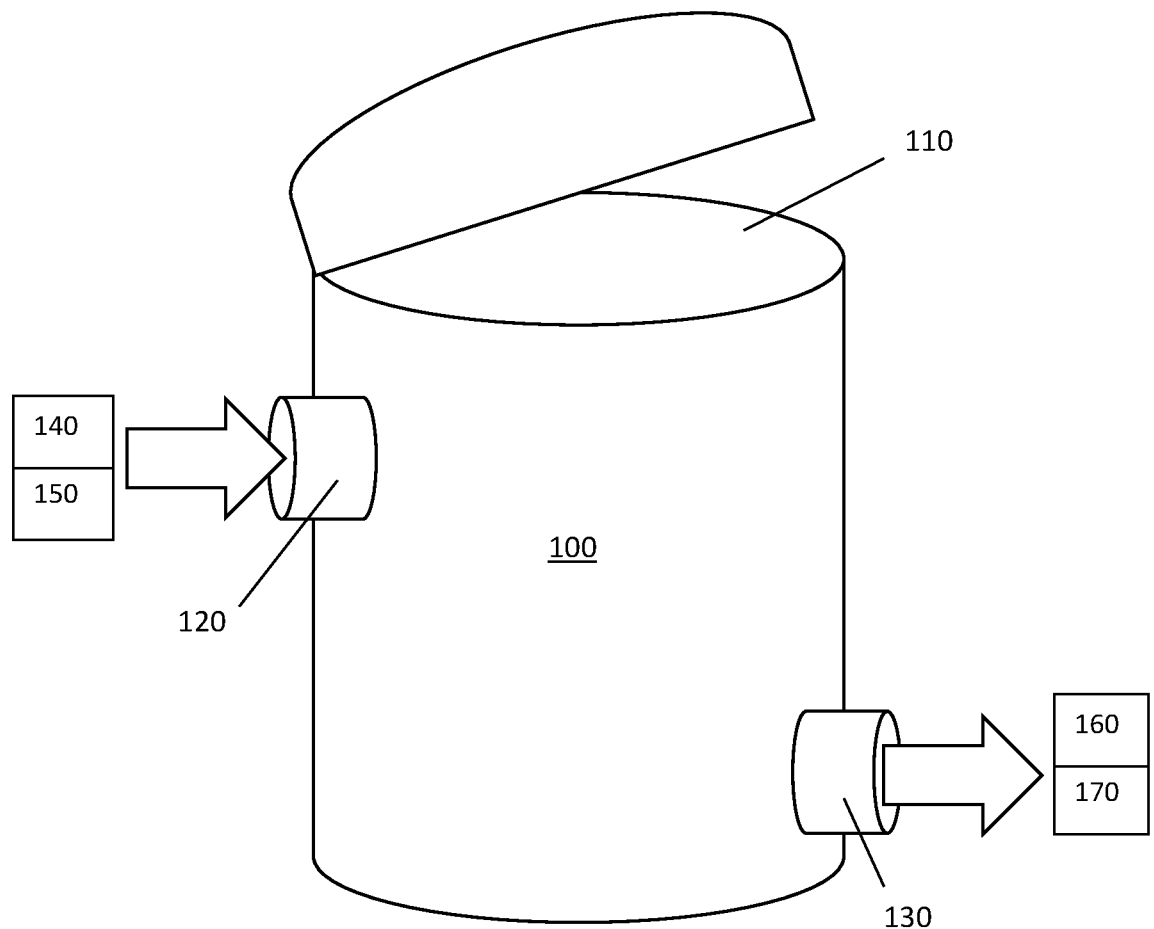
FIG. 1 is a schematic drawing of a vessel, according to an embodiment disclosed herein.

Ion exchange resins may generally be employed to separate components contained in liquid mixtures. Conventional ion exchange resins may be prepared by functionalizing a copolymer matrix with groups having cationic and anionic sites. The anions or cations may be capable of being exchanged for, or associated with, ions or molecules in the liquid having the same charge when the resin is in contact with the liquid mixture. The ions are exchanged stoichiometrically, maintaining electroneutrality of the system. A resin that exchanges one positive ion (or a proportionate quantity based on valency), such as hydrogen, for another positive ion, such as copper, iron, or sodium, is a cation resin. A resin that exchanges one negative ion (or a proportionate quantity based on valency), such as hydroxide, for another negative ion, such as chloride, sulfate, or chromate, is an anion resin. In many cases, both types of resins are used to remove various salts, such as sodium chloride or calcium sulfate, from solution. A mixed bed ion exchange resin includes a combination of cation resin and anion resin to provide a higher purity of treated water. The resin may be used until it becomes saturated with the ions being removed. Many resins may also be regenerated and reused. For example, resins used in water treatment may be regenerated by using strong acids (for cation resins) or strong bases (for anion resins).

Ion exchange is often used in water treatment, where ions in aqueous solution typically displace hydrogen ($H^+$) or hydroxide ($OH^-$) ions bound to a substrate, for example, an ion exchange resin. This is sometimes known as "water demineralization" or "water deionization." Ion exchange resins may generally be used in the fields of, for example, water purification, nuclear power generation, semiconductor manufacturing, food processing, pharmaceutical manufacturing, chemical processing, and metal extraction.

Under certain conditions, ion exchange resins may experience oxidative degradation of the copolymer matrix over an extended period of time. Liquid mixtures that are placed in contact with the resin, for example, during purification of the liquid mixture, may contain quantities of oxidizing species such as molecular oxygen, dissolved oxygen, dissolved chlorine, or may have an elevated temperature. Each of these may promote undesired degradation of the copolymer matrix. In some instances, ion exchange resins may experience oxidative degradation during handling, storage, or transportation prior to use. For example, water or air that is in contact with ion exchange resins prior to use may also promote degradation of the copolymer matrix.

Specifically, it is believed that during oxidative degradation, carbon-carbon bonds rupture, breaking cross-links between individual polymer chains and/or links between individual styrene moieties. As used herein, "oxidative degradation" of an ion exchange resin material refers to the loss of carbon-carbon bonds of the cross-links between individual polymer chains or styrene moieties of the material's copolymer matrix. While not wishing to be bound by any particular theory, it is believed that the loss of such bonds may cause an increase in water retention capacity and, ultimately, in the release of organic contaminants, such as segments of functionalized linear polystyrene. Oxidative degradation of the copolymer matrix may be undesirable for commercial operation of an ion exchange or chromatographic process. For example, resins which lose cross-links may become relatively soft and swell to a greater extent. Resin softness and increased swelling as a result of oxidative degradation may ultimately cause one or more of an increased bed pressure drop, a reduced flow rate for the liquid mixture being treated, and a reduced operating capacity for removing chemical species from liquids to be treated.

Additionally, the loss of cross-links in the copolymer matrix may increase the release of organic contaminants into column effluent which can be unacceptable in some applications, such as in the nuclear power generation industry. Organic contaminants, for example, from degraded ion exchange resin, may create a source of potential corrosion to process equipment or foul other ion exchange resins associated with a process. Ionic contaminants can also arise from degraded ion exchange resin. For instance, in an exemplary treatment process, cation exchange resin may contain a fixed sulfonic acid charge on a styrene backbone. The sulfonic acid is negatively charged. A positively charged ion, such as sodium or calcium, can be exchanged with another ion from the ion exchange resin, for example a hydrogen ion (H+), such that the sodium or calcium is removed from the liquid being treated. However, in some instances, the resin can degrade to an extent that sulfate ions leach from the cation exchange resin. The leaching sulfate ions can have a detrimental effect on the quality of the treated water.

Previously, those in industry attempted to remedy oxidative degradation of ion exchange resin and its associated problems by increasing the amount of cross-linking monomer used in preparing the copolymer matrix. However, an increase in the number of cross-links generally rendered the resulting resin bead less compatible with liquid mixtures, thereby resulting in reduced diffusion into the bead and poor operating capacity. A highly cross-linked resin may also exhibit poor regeneration efficiency and may be impermeable with respect to large molecules, such as glucose, fructose, and other sugars. Furthermore, increasing the cross-link density may not address problems associated with release of organic contaminants, since degradation still occurs.

Others in industry attempted to remedy oxidative degradation of ion exchange resin by substituting a halogen for a hydrogen at a tertiary carbon adjacent to a benzene ring of a styrene moiety. Briefly, as postulated in U.S. Pat. No. 3,342,755, incorporated herein by reference in its entirety for all purposes, a possible mechanism for degradation of the copolymer matrix is related to a "weak link" identified at a tertiary carbon adjacent to the benzene ring of a styrene moiety. The tertiary carbon is deemed a weak link due to the tendency of its attached hydrogen to form hydroperoxide with oxidizing agents like molecular oxygen or chlorine. The hydroperoxides may eventually lead to splitting of carbon chains associated with the copolymer. In the '755 patent, the inventors attempted to remedy the degradation by employing a monomer such as ortho-chlorostyrene, that does not contribute to resin stability.

When degradation of ion exchange resin does occur, conventionally, an attempt may be made to rinse degradation products from the ion exchange resin unless resin performance has been compromised. When rinsed with standard rinse water (non-deoxygenated water) the ion exchange resin may continue to experience oxidative degradation and/or contamination. Residual polymer fragments and impurities during polymerization and activation steps in the manufacturing of ion exchange resin are entangled and will slowly leach from the resins. These also must be rinsed out to an acceptable level in certain industrial applications. Furthermore, in certain instances, rinsing the ion exchange resin generates a large volume of waste. For example, in the nuclear industry, rinsing the ion exchange resin may generate a large volume or radioactive waste water that is complicated to dispose of There exists a need for stabilization of virgin ion exchange resin while it remains offline, prior to use.

Ion exchange resin may be stabilized, and oxidative degradation of the ion exchange resin may be prevented by limiting exposure of the resin to oxidants such as molecular oxygen, dissolved oxygen, or chlorine. Conventionally, before being used to treat a liquid, ion exchange resins are often stored in vessels comprising moisture. The present inventors recognized that ion exchange resin may be stabilized prior to use by preventing exposure of the ion exchange resin to oxygen and/or chlorine dissolved in the standard rinse water and limiting a rate of oxidative degradation of the resin. Furthermore, conventional ion exchange resin storage vessels may generally allow ingress of air into the vessel, causing a rapid rate of oxidative degradation of the ion exchange resin. The present inventors have recognized that ion exchange resin may further be stabilized by preventing contact with oxygen, for example, from ambient air, further limiting oxidative degradation of the ion exchange resin. Stabilization may allow the ion exchange resin to remain viable while offline for a predetermined period of time as compared to ion exchange resin that is conventionally stored prior to use. Methods disclosed herein may also reduce a volume of waste water that is generated during rinsing.

Aspects and embodiments disclosed herein relate to stabilization of virgin ion exchange resin material. In some embodiments, stabilization of the ion exchange resin may refer to maintaining stability of the ion exchange resin over time, for example during handling, storage, and/or transportation. Stabilization and maintained stability may relate to a reduction in the rate of oxidative degradation of the virgin ion exchange resin material. Specifically, as used herein, "stabilized" ion exchange resin material may refer to ion exchange resin material having a reduced rate of oxidative degradation over a predetermined period of time.

In accordance with an aspect, there is provided a method of stabilizing virgin ion exchange resin material. The method comprises rinsing the virgin ion exchange resin material with deoxygenated water to produce a rinsed virgin ion exchange resin material. The method may further comprise introducing the rinsed virgin ion exchange resin material into a gas impermeable vessel. The method may further comprise hermetically sealing the vessel.

As used herein, "virgin" ion exchange resin material may refer to unused or unspent ion exchange resin material. Virgin ion exchange resin material may include newly manufactured resin and/or used resin that has been processed to meet required specifications for new use. For instance, raw or unrefined resin may be processed for new use by treating with high purity water. Used resin may also be regenerated for reuse by treating with strong acids or strong bases. Virgin ion exchange resin material may include cation exchange resin, anion exchange resin, and mixed cation exchange resin and anion exchange resin.

Embodiments disclosed herein may incorporate rinsing ion exchange resin material with deoxygenated water. Deoxygenated water is water that has been treated for removal of molecular oxygen, for example, of dissolved oxygen. Generally, non-deoxygenated water may comprise more than about 1 ppm molecular dissolved oxygen, and up to about 20 ppm dissolved oxygen or more. Dissolved oxygen in water may fluctuate with temperature, salinity, and pressure change. Dissolved oxygen concentration may be measured by one or more of meter, sensor, Winkler titration, and a colorimetric method. Embodiments disclosed herein may incorporate measuring one or more of temperature, pressure, salinity, and dissolved oxygen concentration of water.

In accordance with certain embodiments, methods disclosed herein may further comprise producing deoxygenated water. Deoxygenated water may be produced by deoxygenating non-deoxygenated water, for example, from a source of non-deoxygenated water. Deoxygenated water may be produced by treating non-deoxygenated water to remove dissolved oxygen. In some embodiments, deoxygenating non-deoxygenated water may remove at least about 75% of dissolved oxygen. Deoxygenating non-deoxygenated water may remove at least about 75%, at least about 80%, at least about 85%, at least about 90%, at least about 95%, at least about 99%, or about 100% of dissolved oxygen from the non-deoxygenated water. Deoxygenating non-deoxygenated water may remove between about 90% and about 100% of dissolved oxygen from non-deoxygenated water. Non-deoxygenated water may comprise deionized water, ultrapure water, high purity water, distilled water, microfiltered water, ultrafiltered water, water that has been subjected to reverse osmosis or ultraviolet oxidation, granular activated carbon treated water, or water that has otherwise been processed to remove contaminants.

Non-deoxygenated water may be deoxygenated by passing through a deoxygenation membrane. For instance, the deoxygenation membrane may comprise a Liqui-Cel® membrane contactor (manufactured by 3M Industrial Group, Maplewood, Minn.). Briefly, a deoxygenation membrane may remove dissolved gases from liquids with a mass transfer driving force. According to Henry's law, the amount of gas dissolved in a liquid at equilibrium is proportional to the gas's partial pressure in the vapor-phase in contact with the liquid. Under standard temperature and pressure (25° C. and 1 atm), at equilibrium water may comprise about 8.5 ppm dissolved oxygen, 14.5 ppm dissolved nitrogen, and some dissolved carbon dioxide. By reducing the partial pressure of a gas in contact with the liquid, the amount of gas dissolved in the liquid may be reduced correspondingly. The partial pressure of the gas may be reduced by lowering the total pressure of the gas phase or altering the concentration of the gases in the gas phase. Each of these changes may be applied to the gas side of the membrane, driving out dissolved gases from the liquid through the membrane.

Non-deoxygenated water may be deoxygenated by subjecting to vacuum degasification. Vacuum degasification may be achieved with a vacuum degasification tower or specialized vacuum chamber. To reduce a concentration of gas dissolved in a liquid with vacuum degasification, the total pressure of the gas phase may be lowered by applying a vacuum to the gas. Mass transfer may drive out dissolved gases from a liquid in contact with the gas.

In some embodiments, methods disclosed herein comprise rinsing the virgin ion exchange resin material with deoxygenated water having a concentration of dissolved oxygen effective to reduce a rate of oxidative degradation of the virgin ion exchange resin material. Generally, a reduced rate of oxidative degradation may contribute to resin stability, capacity for purifying liquids, reduced rate of cross-linkage break down, reduced incidence of impurities, improved bead integrity, and/or reduced concentration of ionic contaminants in treated liquid. For instance, in some embodiments, a stabilized ion exchange resin may have between about a 90% and about a 70% reduced rate of cross-linkage break down over a predetermined storage period, for example, a storage period of at least six months. A stabilized ion exchange resin may have about a 100% reduced rate of cross-linkage break down, about a 90% reduced rate of cross-linkage break down, about an 80% reduced rate of cross-linkage break down, about a 70% reduced rate of cross-linkage break down, or about a 60% reduced rate of cross-linkage break down. The % reduction in degradation (and de-cross-linkage) may be is dependent on the concentration of oxidizer present as well as iron and other metals in or on the resin which serve as a catalyst for breakdown.

In some embodiments, a stabilized ion exchange resin may comprise less than about 100 ppm metallic impurities (dry wt.), including, for example, aluminum, copper, iron, sodium, and lead, and/or less than about 10 ppm organic impurities (soak), including, for example, total organic carbon (TOC), sulfate, and chloride, after a predetermined storage period, for example, a storage period of at least six months. Specifically, a stabilized ion exchange resin may comprise less than or equal to about 50 ppm iron impurities, less than or equal to about 40 ppm, less than or equal to about 30 ppm, less than or equal to about 20 ppm, less than or equal to about 10 ppm, less than or equal to about 5 ppm, or less than or equal to about 1 ppm iron impurities. A stabilized ion exchange resin may comprise less than or equal to about 5 ppm TOC, sulfate, or chloride impurities, less than about 4 ppm, less than about 3 ppm, less than about 2 ppm, less than about 1 ppm, less than about 0.5 ppm, or less than about 0.1 ppm TOC, sulfate, or chloride impurities, less than about 1 ppb of TOC, and even less than about 0.5 ppb of TOC. These concentration may be measured analytically, in the rinse water passing through the resin and/or soaking of the resin and measuring the TOC in the effluent water. Levels are being measured to less than 1 ppb and even less than 0.5 ppb of TOC. In some embodiments, a stabilized ion exchange resin material that has been stored for a predetermined storage period may substantially resemble, for example in bead integrity, concentration of impurities, and/or concentration of ionic contaminants in treated liquid, a new or regenerated ion exchange resin material.

Methods disclosed herein may involve a predetermined storage period. The predetermined storage period may generally include any time the ion exchange resin is kept in the hermetically sealed vessel. The storage period may include storage, handling, transportation, or any purpose for maintaining the ion exchange resin within the hermetically sealed vessel. As used herein, a predetermined storage period may include a storage period of at least about 15 days, a storage period of at least about 30 days, a storage period of at least about one month, a storage period of at least about two months, a storage period of at least about three months, a storage period of at least about six months, a storage period of at least about nine months, a storage period of at least about 12 months, a storage period of at least about 18 months, or a storage period of at least about 24 months.

In some embodiments, the rate of oxidative degradation of a virgin ion exchange resin material may be reduced such that a first volume of water treated by the virgin ion exchange resin material comprises less than about 1 ppb TOC to less than about 10 ppb TOC. In some embodiments, the rate of oxidative degradation may be reduced such that the first volume of water treated by the virgin ion exchange resin material comprises less than about 1 ppb TOC to less than about 10 ppb TOC after maintaining the virgin ion exchange resin material in the vessel for a predetermined period of time. For instance, the first volume of water treated may comprise less than about 30 ppb TOC, less than about 20 ppb TOC, less than about 10 ppb TOC, less than about 5 ppb TOC, less than about 1 ppb TOC, less than about 0.5 ppb TOC, or less than about 0.1 ppb TOC.

As disclosed herein, a first volume of water treated by ion exchange resin material includes an initial monitored soak or rinse of an ion exchange resin material, once the ion exchange resin material is placed on line to treat water. In some embodiments, the concentration of contaminants in the first volume of water treated may be measured from water that is in contact with the ion exchange resin material. In other embodiments, the concentration of contaminants in the first volume of water treated may be measured downstream from the ion exchange resin material contact, for example such that the water is diluted or concentrated in downstream processes. In some embodiments, the water may be diluted or concentrated at least about 100, about 200, or about 300 times. In such embodiments, the concentration of contaminants measured in the diluted or concentrated water may be extrapolated to determine the concentration of contaminants in non-diluted or non-concentrated first volume of treated water. Accordingly, a concentration of contaminants in the first volume of treated water, as disclosed herein, may refer to a non-diluted and non-concentrated concentration of contaminants. The first volume of treated water may comprise, for example, between about 25 gallons and about 150 gallons of treated water. In some embodiments, the non-diluted, non-concentrated first volume of treated water comprises about 25 gallons, about 50 gallons, about 75 gallons, about 100 gallons, about 125 gallons, or about 150 gallons of treated water. Alternatively, the first 15-20 resin bed volumes of rinse water passed through the ion exchange resin material may contain high ppb or low ppm levels of organics, including organic sulfates and organic chlorides.

In some embodiments, the rate of oxidative degradation may be reduced such that a first volume of water treated by the virgin ion exchange resin material comprises less than about 10 ppb sulfate. The rate of degradation while in service may be impacted by temperature, nuclear radiation, and/or oxidation and metals present on the resin. In some embodiments, the rate of oxidative degradation may be reduced such that a first volume of water treated by the virgin ion exchange resin material comprises less than about 10 ppb chloride. The rate of oxidative degradation may be reduced such that the first volume of water treated by the virgin ion exchange resin material comprises less than about 10 ppb sulfate and/or less than about 10 ppb chloride after maintaining the virgin ion exchange resin material in the vessel for a predetermined period of time. For instance, the first volume of water treated may comprise less than about 30 ppb sulfate or chloride, less than about 20 ppb sulfate or chloride, less than about 10 ppb sulfate or chloride, less than about 5 ppb sulfate or chloride, less than about 1 ppb sulfate or chloride, less than about 0.5 ppb sulfate or chloride, or less than about 0.1 ppb sulfate or chloride.

In some embodiments, the rate of oxidative degradation may be reduced such that the first volume of water treated by the virgin ion exchange resin material comprises less than about 10 ppb TOC, less than about 10 ppb sulfate, and/or less than about 10 ppb chloride after maintaining the virgin ion exchange resin material in the vessel for a predetermined storage period, for example at least about six months.

In some embodiments, the deoxygenated water may comprise less than about 0.1 ppm dissolved oxygen. For instance, deoxygenated water may comprise less than about 0.1 ppm, less than about 50 ppb, less than about 40 ppb, less than about 30 ppb, less than about 20 ppb, less than about 10 ppb, less than about 8 ppb, less than about 6 ppb, less than about 5 ppb, less than about 4 ppb, less than about 3 ppb, less than about 2 ppb, less than about 1 ppb, or less than about 0.5 ppb dissolved oxygen.

Deoxygenation may remove other dissolved gases in the water, for example, dissolved carbon dioxide, dissolved nitrogen, and other ambient air gases. In some embodiments, the deoxygenated water may comprise less than about 0.1 ppm dissolved carbon dioxide or dissolved nitrogen. For instance, deoxygenated water may comprise less than about 0.1 ppm, less than about 50 ppb, less than about 40 ppb, less than about 30 ppb, less than about 20 ppb, less than about 10 ppb, less than about 8 ppb, less than about 6 ppb, less than about 5 ppb, less than about 4 ppb, less than about 3 ppb, less than about 2 ppb, less than about 1 ppb, or less than about 0.5 ppb dissolved carbon dioxide or dissolved nitrogen.

Methods disclosed herein may comprise treating deoxygenated water or non-deoxygenated water to remove oxidizing contaminants. Deoxygenated or non-deoxygenated water may comprise low quantities of other oxidizing contaminants, for example chlorine chloramine, and/or hydrogen peroxide. Deoxygenated or non-deoxygenated water may be treated with membrane filtration, reverse osmosis, high purity reducing agents (for example, sodium bisulfite) or granulated active carbon to remove oxidizing contaminants like chlorine. In some embodiments, deoxygenated or non-deoxygenated water may comprise less than about 0.1 ppm chlorine. For instance, deoxygenated water may comprise less than about 0.1 ppm, less than about 50 ppb, less than about 40 ppb, less than about 30 ppb, less than about 20 ppb, less than about 10 ppb, less than about 8 ppb, less than about 6 ppb, less than about 5 ppb, less than about 4 ppb, less than about 3 ppb, less than about 2 ppb, less than about 1 ppb, or less than about 0.5 ppb chlorine, chloramine, and hydrogen peroxide.

Methods disclosed herein may comprise rinsing virgin ion exchange resin material by introducing deoxygenated water into the gas impermeable vessel with the virgin ion exchange resin material, and removing interstitial (oxygenated) water from the vessel. For instance, the vessel comprising virgin ion exchange resin material may be filled with deoxygenated water and substantially drained of the deoxygenated water, displacing the oxygenated water with deoxygenated water. In some embodiments, methods disclosed herein may comprise maintaining a moisture content in the rinsed virgin ion exchange resin material. As disclosed herein, moisture content may refer to the quantity of liquid or water contained in a material. Moisture content may be defined as the ratio of mass of liquid, for example water, in a sample to the mass of solids, for example, ion exchange resin, in the sample expressed as a percentage. The interstitial moisture is the water in the void space between individual resin beads. The moisture of the bead itself is the moisture or hydration within the resin bead that is measured for % moisture. Most plastics (and other materials) have an inherent amount of moisture within the material that can be dried and the difference in weight is measured. The deoxygenation portion of methods disclosed herein is displacing, and otherwise removing, both locations of oxygenated water.

In some embodiments the method comprises maintaining at least about 20% moisture content in the rinsed virgin ion exchange resin material. Methods may comprise maintaining at least about 20%, at least about 30%, at least about 40%, at least about 50%, at least about 60%, or at least about 70% moisture content in the rinsed ion exchange resin material. In some embodiments, the method comprises maintaining less than about 50% moisture content in the rinsed virgin ion exchange resin material. The method may comprise maintaining less than about 80%, less than about 70%, less than about 60%, less than about 50%, less than about 40%, or less than about 30% moisture content in the rinsed ion exchange resin material. In some embodiments, the method comprises maintaining between about 20% and about 80%, between about 30% and about 60%, or between about 40% and about 50% moisture content in the rinsed virgin ion exchange resin material. The residual moisture content may be maintained in the virgin ion exchange resin material while the vessel is sealed, for example, while the vessel comprising rinsed virgin ion exchange resin material is handled, stored, or transported. In some embodiments, the moisture content may contribute to stabilization of the rinsed virgin ion exchange resin material over time. For instance, the moisture content may contribute to a reduced rate of oxidative degradation of the virgin ion exchange resin material.

Higher cross-linkage resins may guard against the significance of oxidative degradation. The higher cross-linkage contains entangled organics resulting in some period of lower TOC levels. This effect may be nullified with continued oxidizer exposure to the resin.

In some embodiments, methods disclosed herein may further comprise unsealing the vessel and rinsing the virgin ion exchange resin material. The method may further comprise unsealing the vessel and rinsing the virgin ion exchange resin material after maintaining the virgin ion exchange resin material in the vessel for a predetermined period of time, as previously described. For instance, the method may further comprise unsealing the vessel and rinsing the virgin ion exchange resin material after maintaining the virgin ion exchange resin material in the vessel for at least about six months. The method may further comprise unsealing the vessel and rinsing the virgin ion exchange resin material prior to use. The virgin ion exchange resin material may be rinsed prior to use with deoxygenated water. In some embodiments, the virgin ion exchange resin material may be rinsed prior to use with deoxygenated water having any concentration of dissolved oxygen, dissolved gases, or oxidizing contaminants as previously disclosed herein. The virgin ion exchange resin material may be rinsed prior to use with deoxygenated water having been produced by any of the methods previously disclosed herein.

In accordance with another aspect, there is provided a method of facilitating water treatment at a site in need thereof. The site in need thereof may be related to, for example, nuclear power generation, semiconductor manufacturing, food preparation, pharmaceutical manufacturing, chemical processing, and metal extraction, or any site in need of water treatment that may benefit from ion exchange water treatment technology. Generally, the method of facilitating water treatment at a site may comprise rinsing virgin ion exchange resin material with deoxygenated water to produce a rinsed virgin ion exchange resin material, introducing the rinsed virgin ion exchange resin material into a gas impermeable vessel, and hermetically sealing the vessel, as previously described herein. The method of facilitating water treatment may comprise providing the gas impermeable vessel comprising the rinsed virgin ion exchange resin material and residual moisture to the site, for example, to the water treatment site. In some embodiments, the method of facilitating water treatment may further comprise providing instructions for use of the vessel comprising virgin ion exchange resin material.

Residual moisture content may comprise maintaining a percentage of moisture content in the rinsed ion exchange resin, as previously described. For example, residual moisture content may comprise between about 40% and about 50% moisture content. Residual moisture content may comprise between about 20% and about 80%, between about 30% and about 60%, or between about 40% and about 50% moisture content in the rinsed virgin ion exchange resin material, or any amount of moisture content as previously described.

In some embodiments, the method of facilitating water treatment at a site in need thereof may comprise rinsing virgin ion exchange resin material with deoxygenated water, for example, having a concentration of dissolved oxygen of less than about 10 ppb. In some embodiments, the virgin ion exchange resin material may be rinsed with deoxygenated water having any concentration of dissolved oxygen, dissolved gases, or oxidizing contaminants as previously disclosed herein.

In accordance with certain embodiments, methods disclosed herein may further comprise providing instructions. Methods may comprise providing instructions to maintain the virgin ion exchange resin material in the hermetically sealed vessel for a predetermined period of time. For example, methods may comprise providing instructions to maintain the virgin ion exchange resin material in the hermetically sealed vessel until it is ready to be used. The predetermined period of time may include any amount of storage, handling, and/or transportation time required before use of the ion exchange resin. The predetermined period of time may include any predetermined period of time as previously described herein.

Methods disclosed herein may comprise providing instructions to maintain the hermetically sealed vessel under certain conditions. For instance, methods may comprise providing instructions to maintain a vessel comprising cation exchange resin at a temperature of below at least about 210° F., below at least about 200° F., or below at least about 190° F. Methods may comprise providing instructions to maintain a vessel comprising anion exchange resin or mixed anion and cation exchange resin at a temperature of below at least about 130° F. or below at least about 120° F. and down to ambient temperatures. Methods may comprise providing instructions to maintain the hermetically sealed vessel at ambient pressure.

In some embodiments, methods may further comprise providing instructions to unseal the vessel and rinse the virgin ion exchange resin material with deoxygenated water, for example, prior to use. The virgin ion exchange resin material may be rinsed with deoxygenated water having any concentration of dissolved oxygen, dissolved gases, or oxidizing contaminants as previously described herein. The methods disclosed herein may comprise instructions to rinse the virgin ion exchange resin material immediately prior to use. In some embodiments, the methods may comprise providing instructions to rinse the virgin ion exchange resin material immediately prior to use while the ion exchange resin is still contained within the vessel. For example, the methods may include providing instructions to fill the vessel with deoxygenated water and remove interstitial water from the vessel, thus rinsing the virgin ion exchange resin material. Methods may comprise providing instructions to unseal the vessel and rinse the virgin ion exchange resin material prior to use in, for example, water treatment.

In some embodiments, the method of facilitating water treatment may comprise instructions to return the vessel after removal of the ion exchange resin material. Such instructions may reduce waste of the vessel and reduce operator time.

In accordance with another aspect, there is provided a vessel comprising virgin ion exchange resin material and deoxygenated water. In some embodiments, the vessel may be hermetically sealed. The vessel may comprise an opening with a hermetic seal. The vessel may further comprise an inlet and an outlet. The inlet and outlet may comprise a hermetic seal. The inlet may be connected to a source of ion exchange resin material or a source of deoxygenated water. The outlet may be connected to a drain for deoxygenated water or a point of use for the ion exchange resin material. For instance, the outlet may be connected to a hose configured to deliver the ion exchange resin material to a point of use.

The vessel may be a container, tank, barrel, basin, chamber, or receptacle configured to hold ion exchange resin and deoxygenated water. The vessel may generally have a volume of between about 20 cubic feet (0.57 m$^3$) and about 50 cubic feet (1.42 m$^3$). For example, the vessel may have a volume of about 20 cubic feet (0.57 m$^3$), 25 cubic feet (0.71 m$^3$), 30 cubic feet (0.85 m$^3$), 35 cubic feet (1.0 m$^3$), 40 cubic feet (1.13 m$^3$), 45 cubic feet (1.27 m$^3$), or 50 cubic feet (1.42 m$^3$). The vessel may generally have a volume that is capable of observing overhead restrictions associated with a site in need of ion exchange resin material.

In some embodiments, the vessel may be constructed from a gas impermeable material. The vessel may be constructed from a material with a high flash point. For instance, the vessel may be constructed from at least one of stainless steel and epoxy-lined carbon steel. Conventionally, ion exchange resin storage and transportation vessels may be constructed from fiber, plastic, or wood. Such materials, although relatively inexpensive, are not gas impermeable and may contribute to oxidative degradation of ion exchange resin material within the vessel. Furthermore, conventional materials may have a low flash point, which may be unsafe and/or undesirable at certain sites in need of ion exchange resin material.

In some embodiments, the vessel may comprise deoxygenated water having any concentration of dissolved oxygen, dissolved gases, or oxidizing contaminants as previously described herein. In some embodiments, the vessel may comprise an interstitial volume of deoxygenated water. In some embodiments, the vessel may comprise deoxygenated water as residual moisture, for example, as moisture content previously described herein.

The vessel may comprise a predetermined volume of void space, for example, the vessel may comprise interstitial void space between ion exchange resin beads and/or a headspace. In some embodiments, the void space is limited. The vessel may comprise substantially no headspace and/or limited interstitial space between resin beads. Limiting the void space may contribute to stability of the ion exchange resin stored, handled, or transported within the vessel.

In some embodiments, the vessel may comprise a preservative. The vessel may comprise a packaged desiccant media. For example, the vessel may comprise a packaged desiccant media contained within the vessel. The packaged desiccant media may be configured to remove oxygen from a void space within the vessel. In some embodiments, the desiccant/deoxidant media is packaged in a fibrous pillow with a porous design that is capable of allowing oxygen exchange.

In some embodiments, the virgin ion exchange resin material may be cation exchange resin. In some embodiments, the virgin ion exchange resin material may be anion exchange resin. In yet other embodiments, the virgin ion exchange resin material may be mixed cation exchange resin and anion exchange resin. The conditions of storage for the vessel, for example temperature, pressure, and/or concentration of dissolved gases in the deoxygenated water, may vary depending on the type of ion exchange resin contained within the vessel. For example, in general continuous exposure of anion resins to greater than about 0.05 ppm free chlorine should be avoided. At a feed temperature of between about 5° C. and about 10° C., standard crosslinked anion resin may be able to withstand free chlorine levels up to about 0.3 ppm, highly crosslinked anion resin may be able to withstand free chlorine levels up to about 0.5 ppm, and macroporous anion resin may be able to withstand free chlorine levels up to about 1 ppm. At a feed temperature of between about 20° C. and about 30° C., standard crosslinked anion resin may be able to withstand free chlorine levels only less than 0.1 ppm, highly crosslinked anion resin may be able to withstand free chlorine levels up to about 0.1 ppm, and macroporous anion resin may be able to withstand free chlorine levels up to about 0.5 ppm. Some cation exchange resin, for example, the DIAION® SK1B resin available from the Mitsubishi Chemical Corporation may have a free chlorine tolerance of about 0.6 mg/L at temperatures between about 5° C. and about 10° C. and a free chlorine tolerance of about 0.1 mg/L at temperatures between about 20° C. and about 25° C. The presence of catalysis, for example, iron or copper may reduce the oxidant levels to which the resins may be exposed without significant degradation.

In accordance with another aspect there is provided a system comprising a vessel including virgin ion exchange resin material and deoxygenated water. The vessel may be gas impermeable and capable of being hermetically sealed, as previously described. The vessel may be connected or connectable downstream from a source of deoxygenated water. The vessel may be connected or connectable downstream from a source of ion exchange resin material. In some embodiments, the vessel is connected or connectable upstream from a drain for used deoxygenated water. The vessel may be connected or connectable upstream from a point of use for the virgin ion exchange resin material, for example, via a hose.

In some embodiments, the system comprises an oxygen monitor. The oxygen monitor may be connected to the vessel and configured to measure a concentration of oxygen within the vessel. The system may comprise a degasifier, for example an in-line degasifier. The degasifier may be a deoxygenation membrane. The degasifier may be fluidly connected or connectable upstream from the vessel. The degasifier may be fluidly connected or connectable downstream from a source of non-deoxygenated water and configured to deoxygenate the non-deoxygenated water.

The system may further comprise a sensor or monitor, for example, a pressure sensor or thermometer. The sensor and/or monitor may be positioned upstream from the vessel and configured to measure temperature and/or pressure of deoxygenated or non-deoxygenated water. The sensor and/or monitor may be electrically connected to a control module. The control module may be configured to control one or more parameter of the in-line degasifier responsive to a measurement received from the sensor and/or monitor. The control module may be connected to the oxygen monitor. The control module may be configured to control one or more parameter of the in-line degasifier responsive to a measurement received from the oxygen monitor.

As shown in FIG. 1, the vessel 100 may comprise virgin ion exchange resin material and deoxygenated water. The vessel 100 may have an opening 110, an inlet 120, and an outlet 130. The opening, inlet, and/or outlet may be capable of being hermetically sealed. The inlet may be connectable to a source of deoxygenated water 140 or a source of ion exchange resin material 150. The outlet may be connectable to a drain 160 or a point of use for the ion exchange resin material 170.

Figure 2:
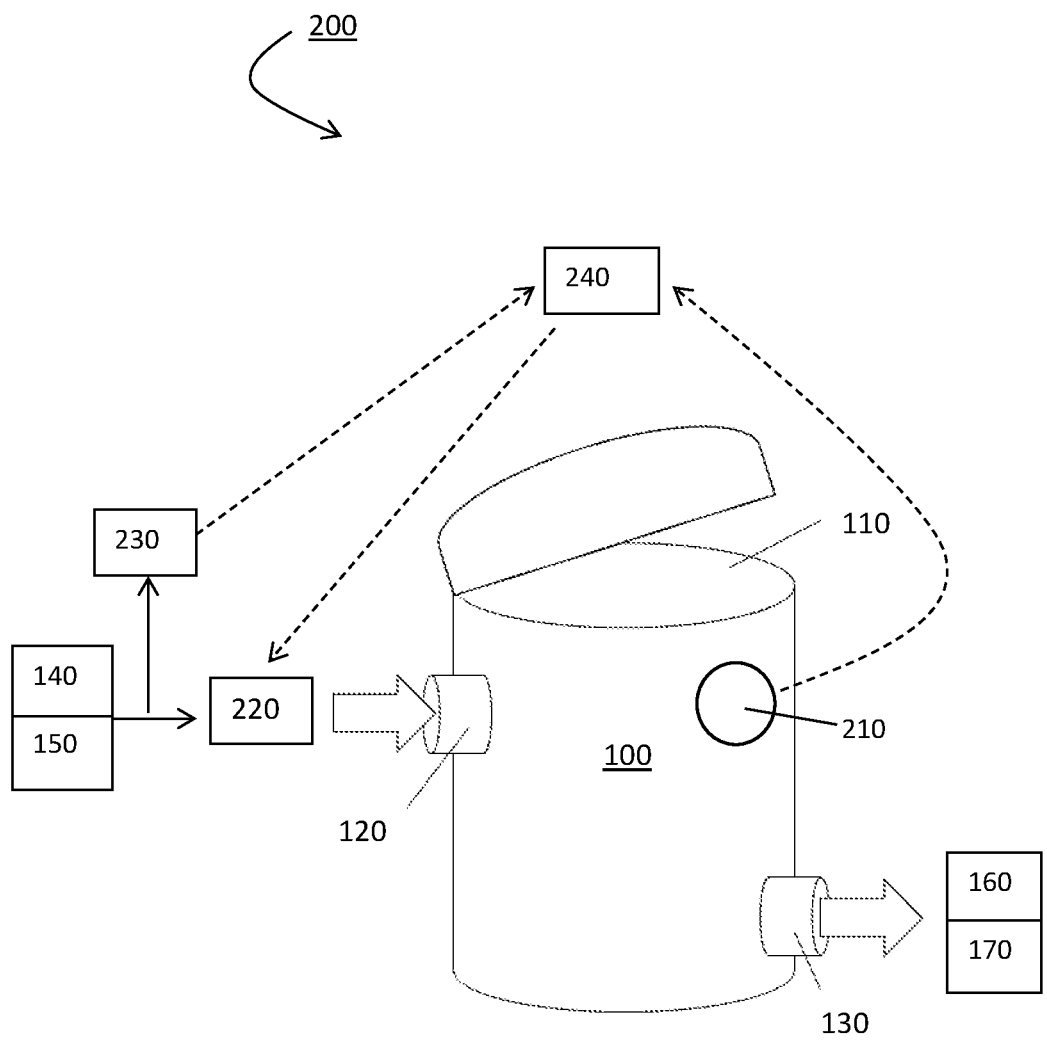
FIG. 2 is a schematic drawing of a system comprising a vessel, according to an embodiment disclosed herein.

As shown in FIG. 2, the system 200 may comprise a vessel 100, having an opening 110, an inlet 120, and an outlet 130. The system may further comprise an oxygen monitor 210, a degasifier 220, a sensor or monitor 230, and a control module 240.

EXAMPLES

Example 1

Application of the Gas Impermeable Vessel Comprising Cation Resin

In one exemplary application, a cation exchange resin that is used in a delithiating application has had issues with sulfates leaching from the resin prior to being used. Conventionally, the resin is rinsed before being put online and the rinse water is drained to a hot well which is radioactive. The radioactive hot well has limitations on the volume of rinse water that it can accept. Furthermore, it is expensive to treat radioactive water from the hot well.

The usage of a gas impermeable vessel comprising ion exchange resin material and deoxygenated water may allow the ion exchange resin to be rinsed prior to use in a non-hot area of the plant, for example, where there are no restrictions on the amount of rinse water generated. The rinse water can go to a common drain and the resin could then be transported to vessels in a radioactive area by hoses.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems containing ion exchange resins or gas impermeable vessels disclosed herein. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to perform a method of reducing a rate of oxidative degradation of an ion exchange resin, or to house or utilize an ion exchange resin or gas impermeable vessel, as described herein. Accordingly the foregoing description and figures are by way of example only. Further the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A method of stabilizing virgin ion exchange resin material, the method comprising:
   rinsing the virgin ion exchange resin material with deoxygenated water having a dissolved oxygen concentration of less than about 10 ppb and a dissolved nitrogen concentration of less than about 0.1 ppm, to produce a rinsed virgin ion exchange resin material;
   introducing the rinsed virgin ion exchange resin material into a gas impermeable vessel;
   hermetically sealing the vessel; and
   storing the rinsed virgin ion exchange resin material with residual deoxygenated water in the hermetically sealed vessel for a predetermined period of time.

2. The method of claim 1, wherein rinsing the virgin ion exchange resin material comprises rinsing with deoxygenated water having a concentration of dissolved chlorine of less than about 10 ppb.

3. The method of claim 1, wherein rinsing the virgin ion exchange resin material comprises introducing deoxygenated water into the gas impermeable vessel and removing interstitial deoxygenated water from the vessel.

4. The method of claim 1, comprising maintaining between about 40% to about 50% moisture content in the rinsed virgin ion exchange resin material.

5. The method of claim 1, further comprising producing the deoxygenated water by deoxygenating non-deoxygenated water.

6. The method of claim 5, comprising one of passing the non-deoxygenated water through a deoxygenation membrane and subjecting the non-deoxygenated water to vacuum degasification to produce the deoxygenated water.

7. The method of claim 1, wherein rinsing the virgin ion exchange resin material comprises rinsing with deoxygenated water having a concentration of dissolved oxygen effective to reduce a rate of oxidative degradation of the virgin ion exchange resin material such that a first volume of water treated by the virgin ion exchange resin material comprises less than about 10 ppb total organic carbon after storing the virgin ion exchange resin material in the vessel for the predetermined period of time.

8. The method of claim 7, wherein the first volume of water treated by the virgin ion exchange resin material comprises less than about 10 ppb sulfate.

9. The method of claim 7, wherein the first volume of water treated by the virgin ion exchange resin material comprises less than about 10 ppb chloride.

10. The method of claim 7, comprising storing the virgin ion exchange resin material in the vessel for a predetermined period of at least about six months.

11. The method of claim 1, further comprising unsealing the vessel and rinsing the virgin ion exchange resin material with deoxygenated water prior to use.

12. The method of claim 1, further comprising removing residual organic material from the virgin ion exchange resin material by rinsing the virgin ion exchange resin material with deionized water prior to use.

13. The method of claim 12, wherein rinsing the virgin ion exchange resin material with deionized water prior to use includes rinsing the virgin ion exchange resin material with non-deoxygenated deionized water.

14. The method of claim 1, wherein rinsing the virgin ion exchange resin material comprises rinsing with deoxygenated water having a dissolved carbon dioxide concentration of less than about 0.1 ppm.

15. A method of facilitating water treatment at a site in need thereof, the method comprising:
rinsing virgin ion exchange resin material with deoxygenated water having a dissolved oxygen concentration of less than about 10 ppb and a dissolved nitrogen concentration of less than about 0.1 ppm, to produce a rinsed virgin ion exchange resin material;
introducing the rinsed virgin ion exchange resin material into a gas impermeable vessel;
hermetically sealing the vessel; and
providing the gas impermeable vessel comprising the rinsed virgin ion exchange resin material and residual moisture to the water treatment site.

16. The method of claim 15, comprising providing the gas impermeable vessel comprising the virgin ion exchange resin material with between about 40% and about 50% moisture content.

17. The method of claim 15, further comprising providing instructions to maintain the virgin ion exchange resin material in the hermetically sealed vessel until it is to be used.

18. The method of claim 15, further comprising providing instructions to unseal the vessel and rinse the virgin ion exchange resin material with deoxygenated water prior to use in water treatment.

19. The method of claim 15, wherein rinsing the virgin ion exchange resin material comprises rinsing with deoxygenated water having a dissolved carbon dioxide concentration of less than about 0.1 ppm.

* * * * *